June 7, 1932.    J. LEDWINKA    1,862,023
VEHICLE BODY WINDOW CONSTRUCTION
Filed Dec. 27, 1929    3 Sheets-Sheet 1
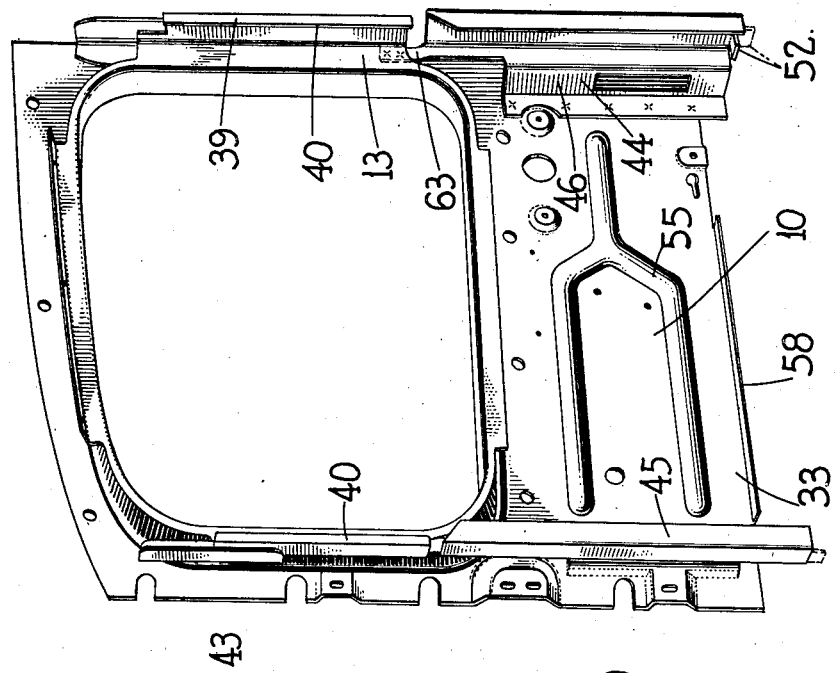
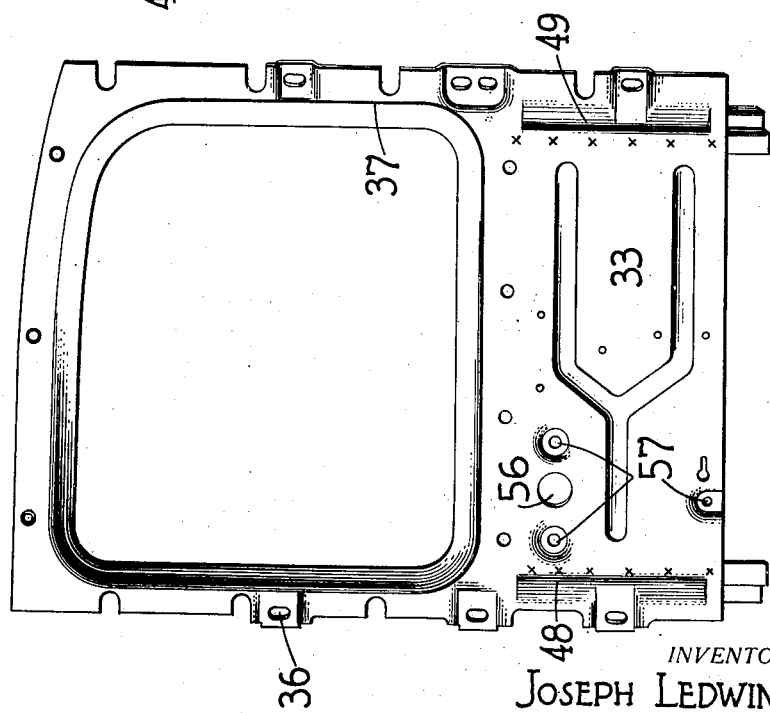
INVENTOR.
JOSEPH LEDWINKA
BY
John P. Tarbox
ATTORNEY.

June 7, 1932.    J. LEDWINKA    1,862,023

VEHICLE BODY WINDOW CONSTRUCTION

Filed Dec. 27, 1929    3 Sheets-Sheet 3

INVENTOR.
JOSEPH LEDWINKA
BY
John P. Tarbox
ATTORNEY.

Patented June 7, 1932

1,862,023

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

VEHICLE BODY WINDOW CONSTRUCTION

Application filed December 27, 1929. Serial No. 416,991.

My invention relates to a vehicle body wall construction and particularly to the construction of such body wall at a window opening therein.

It is among the objects of my invention to provide a body wall construction in which the parts may be readily assembled or disassembled for purposes of construction or repair, to simplify the construction of said wall at the window openings, thereby decreasing the cost of forming and assembly operations, and the cost of the body as a whole, and yet providing a construction which is strong and durable and capable of withstanding the jars and strains of usage to which such bodies are subject over long periods of time.

I attain these objects by the provision of a unitary panel including window moulding, glass run channels and the regulator panel, which is constructed and arranged to permit its assembly with the inner side of a body wall adjacent a window opening together with the window glass and regulator mechanism with the body on the assembly line. If desired, the unitary panel may be painted and upholstered and trimmed prior to such final assembly. Preferably, at least a portion of the window moulding, the glass run channels and the regulator panel are formed of a unitary sheet metal stamping, thereby avoiding a number of joining and cleaning operations and insuring greater accuracy of dimension of the parts.

Other and further objects and advantages will become apparent from the following detailed description when read in connection with the accompanying drawings, in which Figs. 1 and 2 are perspective views, looking respectively, at the inner and outer sides of a unitary sheet metal panel according to my invention and adapted for use in a rear quarter window construction.

Figure 3:
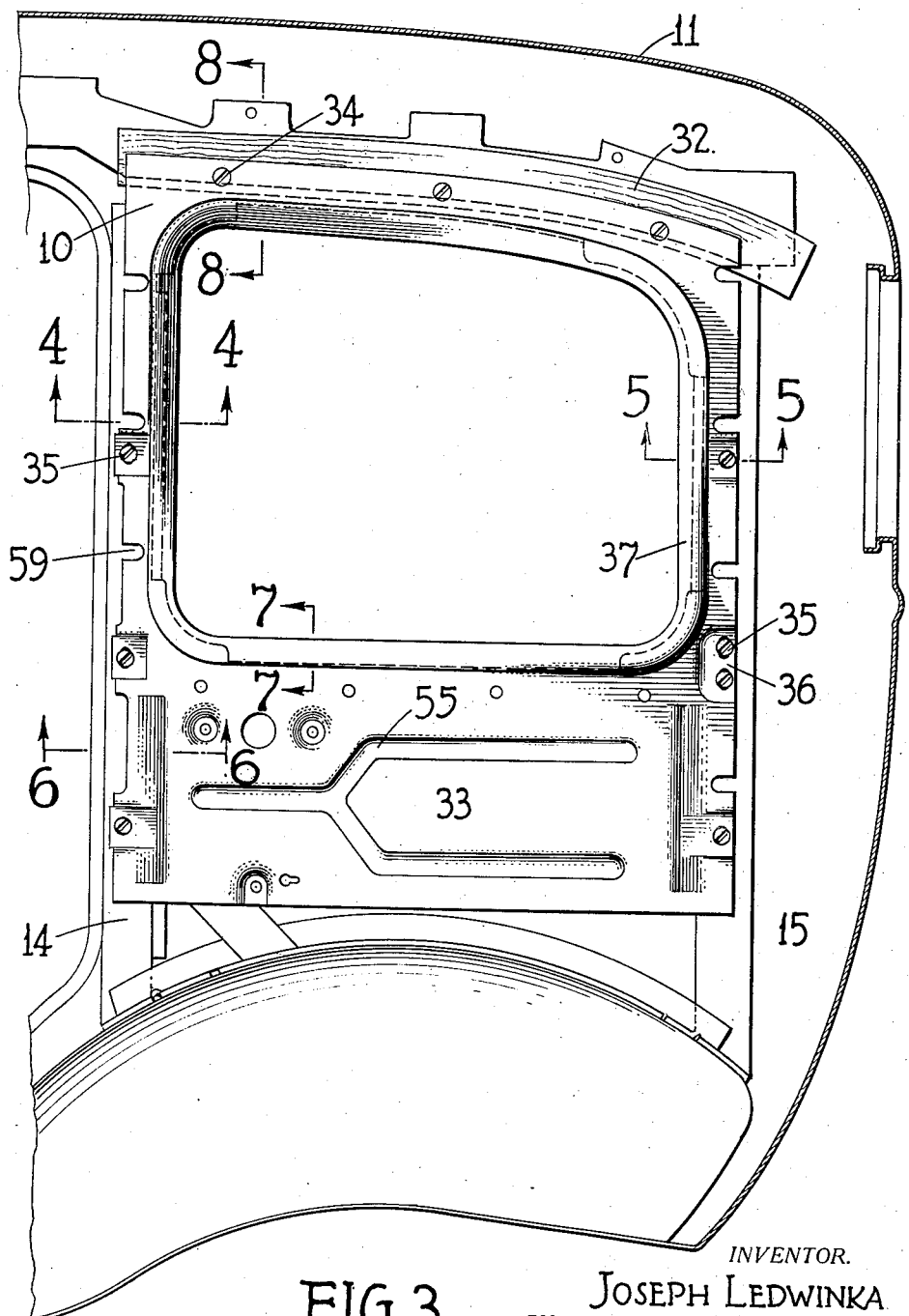
Figure 4:
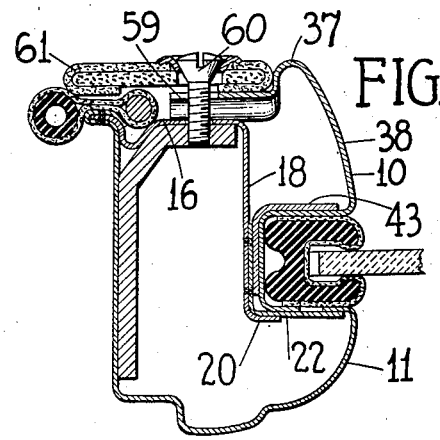
Figure 5:
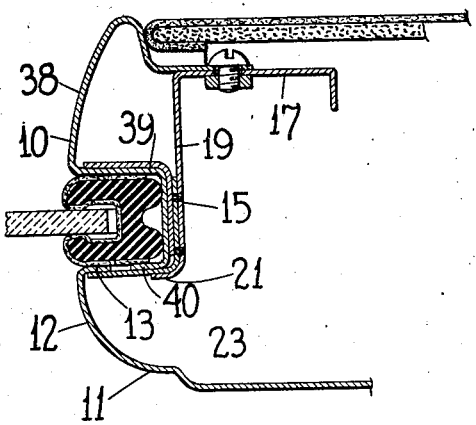
Figure 6:
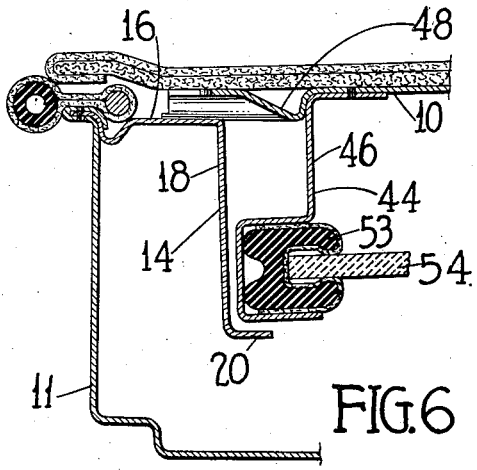

Fig. 3 is longitudinal sectional view through the tonneau of a vehicle body showing the invention applied to the rear quarter window construction.

Figs. 4 to 8, inclusive, show detail sectional views taken respectively on the correspondingly numbered section lines of Fig. 3 and showing the window glass, upholstery and trim in their relation to the adjacent parts of the body wall.

Figure 7:
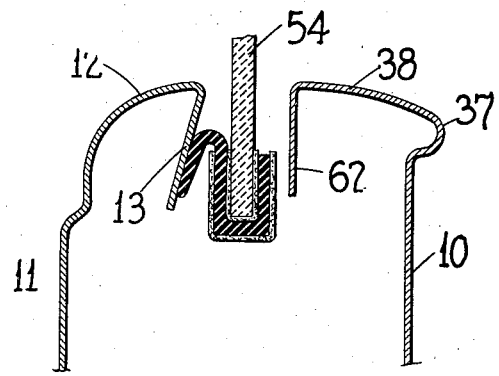
Figure 8:
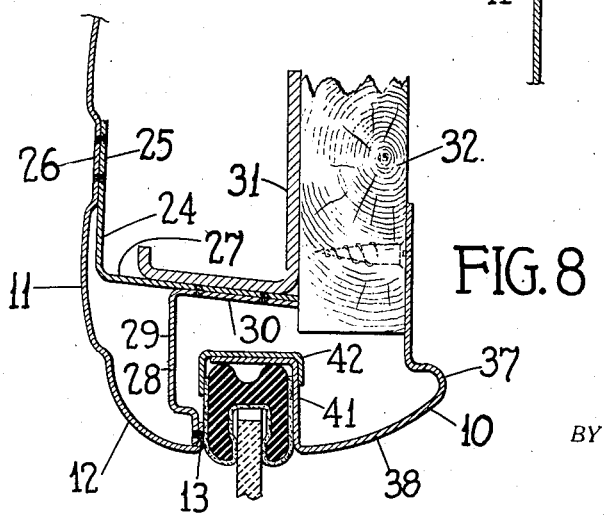

According to the form of the invention shown in the drawings, the novel improved panel is formed as a unitary stamping, designated generally by 10, and I have shown it applied in the present case to the inside of an all metal tonneau construction, comprising the outer panel 11, which may be made up of one or more metal sheets welded together in their margins, but preferably includes a unitary stamping extending entirely around the window opening and flanged inwardly at the sides of the window opening as shown at 12 to form the moulding at the outside of the window. The flange 12 is extended by a flange 13, said flange 13 at sides and top defining the outer wall of the glass run channel. At the bottom the flange 13 is inclined outwardly, as shown in Fig. 7.

At the sides of the window opening, the outer panel is connected to vertically extending post stampings 14 and 15. Said post stampings are of generally Z-shaped cross section and form, with the flange 13 of the outer panel, an inwardly presenting angular seat adapted to receive the removable panel unit 10 in a manner to be presently described.

The inner arms 16 and 17 of the Z-shaped posts are extended substantially in the plane of the body wall while the webs 18 and 19 extend transversely of the wall, and the outer arms 20 and 21 are extended by angle brackets 22 and 23 and secured to the flange 13 of the outer panel. The arms of the angle brackets 22 and 23 overlap the outer side of the flange 13.

At the top, flange 13 is connected to an angular stamping 24, having a vertical arm 25 secured to an inwardly offset portion 26 of the outer panel and a substantially horizontal arm 27, by an angular bracket 28, having one arm as 29 extending vertically and secured to the outer wall of flange 13 of the outer panel and the other arm 30 overlapping and secured to horizontal arm 27 of the stamping 24. A heavier gauge reinforcing angle 31 is seated on and secured to the arm 27, and a wooden tacking strip 32 for the upholstery is fastened by means not shown to the vertically extending arm of the reinforcing angle 31. The inner face of the wooden tacking strip is substantially in the same vertical plane as the inner arms 16 and 17 of the post stampings 14 and 15.

As shown in Figs. 1 and 2, the inner removable panel 10 comprises a unitary stamping extending around the window opening, and downwardly below said opening to form the regulator panel portion 33. The top and side edge portions are adapted to seat against the wooden strip 32 and the inner arms 16 and 17 of the posts, respectively, and are readily secured thereto by screws 34 and 35. The wooden screws 34 have heads adapted to fit flush within the countersinks formed around the holes provided at the upper edge portion of the panel 10, and at the sides the panel stamping is provided with inward offset portions 36 at the location of the screws 35, to receive the heads of the same flush with the inner face of the body of the panel. This flush arrangement is for the purpose of providing a smooth inner surface for the attachment of the upholstery.

The inner panel stamping is formed at the window opening with an inwardly projecting bead 37 of a depth substantially equal to the thickness of the upholstery to be applied and forming a neat and finished appearance around the window opening, and a protection for the edge of the upholstery at said opening.

From the beaded portion, the stamping is formed with an outwardly extending flange 38 forming moulding for the inner side of the window similar to the moulding 12 at the outer side.

At the sides this moulding flange 38 is extended by channel-section flanges 39, the channels facing toward each other to form a runway for the sliding window glass. The outer edge flange 40 of these channels 39 is shallow and adapted, when the inner panel is placed in position, to align itself with the flange 13 on the outer panel to form therewith the full depth outer side walls of the channels, see Figs. 4 and 5. The flanges 40 are deep enough, however, to retain the edges of the window glass even prior to assembly of the inner panel 10 with the body wall.

At the top, I may extend the beading 38 to form an integrally stamped downwardly presenting channel formed similarly to the sides, or as shown, I form an angle section extension 41, to which a separate channel strip 42 is secured to form the glass run channel.

In the rounded corners of the windows it is difficult to make the deep flanges required to make integrally formed glass run channels 39 and angle extensions 43 are welded to the upper portions of the integrally formed channel portions 39 to extend the glass runs upwardly. See Fig. 2.

At the bottom, the moulding flange is formed with a vertical flange 62. To extend the glass run channels downwardly, below the window opening, I provide separate stampings 44 and 45 having channels aligned with the glass run channels at the sides of the window opening, the outer side of said channels being formed with angular extensions 46 which are located in correct alignment with the upper portions of the glass runs by vertical beads 48 and 49 forming with the body of the panel 10, angular seats with which said angular extensions 46 and 47 are nested and secured, as by spot welding them to the body of the stamping in the regulator panel portion 33, thereof. Additional securement of the stampings 44 and 45 is by upward extensions 63 secured, as by welding, to the side flanges 13 forming side walls of the glass run channels of the main stamping 10.

Prior to the assembly of the glass with the panel 10, integral extensions 52 extend downwardly substantially in the plane of the bottom wall of the channel (as shown in dotted lines Fig. 2) to permit unobstructed passage of the glass 54 and the rubber on other flexible weather stripping 53 from below. After the parts have been assembled, the tabs or extensions 52 are bent inwardly at substantially right angles to form stops for the lower limit of movement of the glass. The movement of the glass at the top is limited by the transverse portion of the L-shaped extension flange 41. Thus the glass and weather stripping lining the glass run channels are retained as a unit with the panel 10 whether assembled or not in the body wall.

The lower regulator panel portion 33 of the inner unitary stamping may be stiffened by a generally Y-form stiffening rib 55, and it is provided with an opening 56 for the regulator mechanism spindle and attaching holes 57 formed in depressions in the panel.

The lower edge of the panel 10 may be provided with a stiffening flange 58.

By this construction the unitary inner window moulding and regulator panel may be pre-assembled with the window glass, and the weather stripping, and the panel painted all prior to its assembly with the body wall, and when assembled with the body wall, it is removably secured, so that it can readily be removed by unskilled workmen for repairs, such as the replacement of a broken glass. It may be assembled with the body wall while the body is on the assembly line, and because of the generally flat inner surface of the panel matching the adjacent surfaces of the body wall, the upholstery may be readily applied continuously to the inner side of said continuous wall.

The side edges of the panel stamping 10 are provided with cut-out recesses 59 through which the fastening screws 60 for the upholstery 61 may extend into the nuts secured to the arms 16 and 17 of the rails 14 and 15, the edges of the upholstery when so assembled abutting the beading surrounding the window opening, and the inner surface of the upholstery being substantially flush with said beading.

What I claim is:

1. An inner removable panel unit for a vehicle body window construction comprising an integral panel stamping forming the regulator board and extending around the window opening, said panel stamping being laterally extended around the window opening to provide the moulding for the inner side of said opening, and formed further at the sides of said opening with a glass run channel, and separate glass run channel stampings below the window opening secured to the regulator panel portion of said stamping, whereby the window glass and regulator mechanism may all be assembled or dis-assembled with said stamping as a unit.

2. An inner removable panel unit for a vehicle body window construction comprising a unitary stamping extending entirely around the window opening and formed with peripheral attaching portions extending in the direction of the plane of said opening and formed around said window opening to provide moulding and further provided with integrally formed glass run channels at the sides of said opening.

3. A sheet metal window construction comprising an outer panel extending entirely around the window opening and flanged inwardly to form the moulding in the margins of said opening, and further flanged away from the opening to form a portion of the outer wall of a glass run channel, in combination with a removable inner panel unit also extending entirely around the window opening and flanged inwardly in its margins to form the moulding, said inner panel being further extended at the sides of the window opening to form integral glass run channels, the outer walls of said channels being of less depth than the inner and cooperating with the flanges of the outer panel to form the outer side walls of the glass run channels.

4. An inner removable panel for a vehicle body window construction comprising a unitary stamping extending entirely around the window opening and formed at its top and sides with attaching portions extending in the direction of the plane of the wall, and in the margins of the window opening with transversely extending portions forming window moulding, said transversely extending portions being flanged away from the opening and said flanges away from the opening being further laterally flanged at sides and top to form portions of glass run channels.

5. A vehicle body window construction comprising frame members, in combination with a removable sheet metal stamping extending around the window opening and laterally flanged in the margins of the opening to form moulding therefor and extended downwardly to provide a window regulator panel, the lateral edges of said panel being removably secured to said frame members.

6. A removable vehicle window panel comprising an integral stamping extending entirely around the window opening and down below the window opening to form a regulator board, the stamping being beaded inwardly around the window opening to a depth substantially equal to the thickness of the upholstery to be applied, and flanged laterally entirely around said opening to form moulding for said opening.

7. An inner removable panel unit for vehicle window openings or the like comprising an integral panel stamping extending at least around the sides and bottom of the window opening and flanged at the sides to form integral glass run channels, and extended downwardly to form an integral regulator panel.

8. An inner removable panel unit for vehicle window openings or the like comprising an integral panel stamping extending around a window opening and formed at the sides of the window opening with integral glass run channels and extended downwardly to form an integral regulator panel, the glass run channels at the sides of the window opening being extended downwardly by channel extensions integrally joined to said panel portions, and integral flanges at top and bottom of said panel forming stops for the movements of a window glass associated with said channels.

9. An inner removable panel for vehicle window openings or the like, comprising an integral panel stamping extending at least around the sides and bottom of the window opening and flanged at the sides to form integral glass run channels, and extended downwardly to form an integral regulator panel portion, said regulator panel portion being formed with integral vertical offsets forming angular seats, and glass run channel extensions aligned by said seats with the integral glass run channels and secured to said regulator panel portion.

In testimony whereof I hereunto affix my signature.

JOSEPH LEDWINKA.